(12) United States Patent
Bean et al.

(10) Patent No.: US 9,940,692 B2
(45) Date of Patent: *Apr. 10, 2018

(54) AUGMENTED REALITY OVERLAYS BASED ON AN OPTICALLY ZOOMED INPUT

(71) Applicant: International Business Machines Corporation, Armonk, NY (US)

(72) Inventors: Chris R. Bean, Chandler's Ford (GB); Sophie D. Green, Chelmsford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,808

(22) Filed: Jan. 20, 2017

(65) Prior Publication Data
US 2017/0213316 A1 Jul. 27, 2017

Related U.S. Application Data

(63) Continuation of application No. 15/082,125, filed on Mar. 28, 2016, now Pat. No. 9,589,372, which is a (Continued)

(51) Int. Cl.
*G06T 15/00* (2011.01)
*G06T 19/00* (2011.01)
(Continued)

(52) U.S. Cl.
CPC ............ *G06T 3/20* (2013.01); *G02B 27/0172* (2013.01); *G06F 3/011* (2013.01); *G06F 3/012* (2013.01); *G06K 9/00744* (2013.01); *G06K 9/6215* (2013.01); *G06T 3/40* (2013.01); *G06T 7/20* (2013.01); *G06T 7/248* (2017.01); (Continued)

(58) Field of Classification Search
None
See application file for complete search history.

(56) References Cited

U.S. PATENT DOCUMENTS 9,147,221 B2 9/2015 Grasset et al.
9,197,763 B2 11/2015 Baker et al.
(Continued)

OTHER PUBLICATIONS

Alessandro, et al., "Zooming Interfaces for Augmented Reality Browsers", MobileHCI 2010, Sep. 7-10, 2010, Lisboa, Protugal, ACM, 9 pages.
(Continued)

*Primary Examiner* — Tize Ma
(74) *Attorney, Agent, or Firm* — Daniel R. Simek

(57) ABSTRACT

A method for managing a content overlay. The method included a processor identifying a first image and a second image from an augmented reality (AR) device. The method further includes identifying a first element of interest within the first image. The method further includes associating a corresponding first AR content overlay for the first element of interest. The method further includes determining one or more differences between the first image and the second image, wherein the second image includes at least the first element of interest. The method further includes modifying a position of at least the first AR content overlay based, at least in part, on the one or more differences between the first image and the second image.

1 Claim, 6 Drawing Sheets

Related U.S. Application Data continuation of application No. 15/002,719, filed on Jan. 21, 2016.

(51) Int. Cl.

| | | |
|---|---|---|
| *G06T 3/20* | (2006.01) | |
| *G06T 11/00* | (2006.01) | |
| *G06K 9/00* | (2006.01) | |
| *G06F 3/01* | (2006.01) | |
| *G06T 7/70* | (2017.01) | |
| *G02B 27/01* | (2006.01) | |
| *G06K 9/62* | (2006.01) | |
| *H04N 5/225* | (2006.01) | |
| *G06T 7/73* | (2017.01) | |
| *G06T 7/246* | (2017.01) | |
| *G06T 3/40* | (2006.01) | |
| *G06T 11/60* | (2006.01) | |
| *G06T 7/20* | (2017.01) | |
| *G06K 9/20* | (2006.01) | |
| *G06K 9/32* | (2006.01) | |
| *G06K 9/46* | (2006.01) | |

(52) U.S. Cl.
CPC .................. *G06T 7/70* (2017.01); *G06T 7/74* (2017.01); *G06T 11/00* (2013.01); *G06T 11/60* (2013.01); *G06T 19/006* (2013.01); *H04N 5/2258* (2013.01); *G02B 2027/014* (2013.01); *G02B 2027/0123* (2013.01); *G02B 2027/0138* (2013.01); *G02B 2027/0141* (2013.01); *G06K 9/00288* (2013.01); *G06K 9/00355* (2013.01); *G06K 9/00671* (2013.01); *G06K 9/2018* (2013.01); *G06K 9/3241* (2013.01); *G06K 9/4652* (2013.01); *G06T 2207/30204* (2013.01)

(56) References Cited

U.S. PATENT DOCUMENTS

| | | | |
|---|---|---|---|
| 9,589,372 B1 * | 3/2017 | Bean | .................. G06T 11/00 |
| 2002/0191003 A1 | 12/2002 | Hobgood et al. | |
| 2004/0119662 A1 | 6/2004 | Dempski | |
| 2010/0328344 A1 | 12/2010 | Mattila et al. | |
| 2012/0299962 A1 | 11/2012 | White et al. | |
| 2013/0088514 A1 | 4/2013 | Breuss-Schneeweis et al. | |
| 2015/0302623 A1 | 10/2015 | Ishikawa | |
| 2015/0338652 A1 | 11/2015 | Lim et al. | |
| 2016/0049013 A1 | 2/2016 | Bautista | |
| 2016/0240004 A1 | 8/2016 | Ur et al. | |
| 2017/0132253 A1 | 5/2017 | Mckinnon et al. | |

OTHER PUBLICATIONS

Kelly, Gordon, "iPhone 6S Leak Reveals Radical New Camera", Forbes/Tech, The Little Black Book of Billionaire Secrets, Jan. 14, 2015, 7 pages.

Koller, et al., "Real-time Vision-Based Camera Tracking for Augmented Reality Applications", To appear in the Proceedings of the Symposium on Virtual Reality Software and Technology (VRST-97), Lausanne, Switzerland, Sep. 15-17, 1997, 8 pages.

Taketomi, et al., "Camera pose estimation under dynamic intrinsic parameter change for augmented reality", To appear in Computers & Graphics, Received Date Mar. 7, 2014, Revised/Accepted Date Jul. 11, 2014, 11 pages.

Veas, et al., "Extended Overview Techniques for Outdoor Augmented Reality", IEEE Transactions on Visualization and Computer Graphics, vol. 18, No. 4, Apr. 2012, pp. 565-572.

"Augmented Reality is the Fugure", Metal 1—Developer Kit, Home: Metal Augmented Reality, printed Oct. 29, 2015, 4 pages.

"Microsoft HoloLens", printed Oct. 29, 2015, 9 pages.

Bean et al., "Augmented Reality Overlays Based on an Optically Zoomed Input", U.S. Appl. No. 15/002,719, filed Jan. 21, 2016, 50 pages.

Bean et al., "Augmented Reality Overlays Based on an Optically Zoomed Input", U.S. Appl. No. 15/082,125, filed Mar. 28, 2016, 50 pages.

IBM Appendix P, List of IBM Patent Applications Treated as Related, Filed Herewith, 2 pages.

* cited by examiner

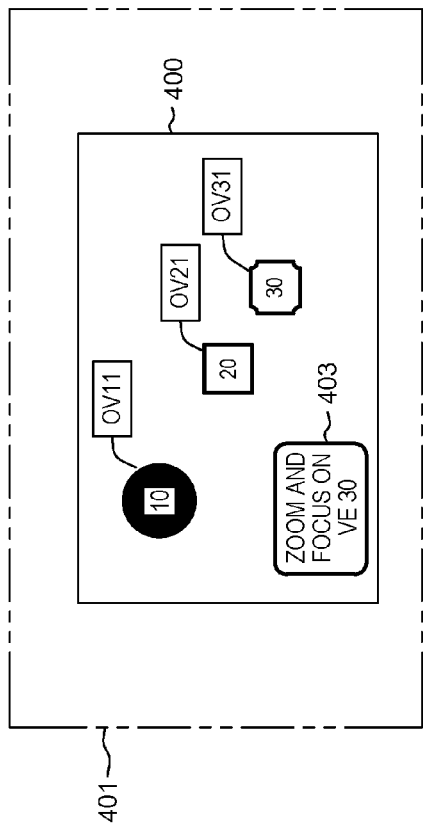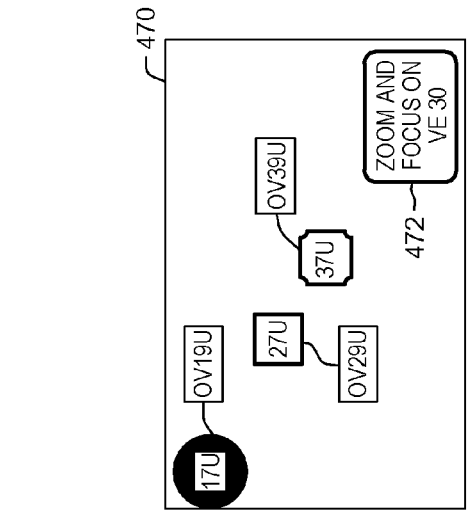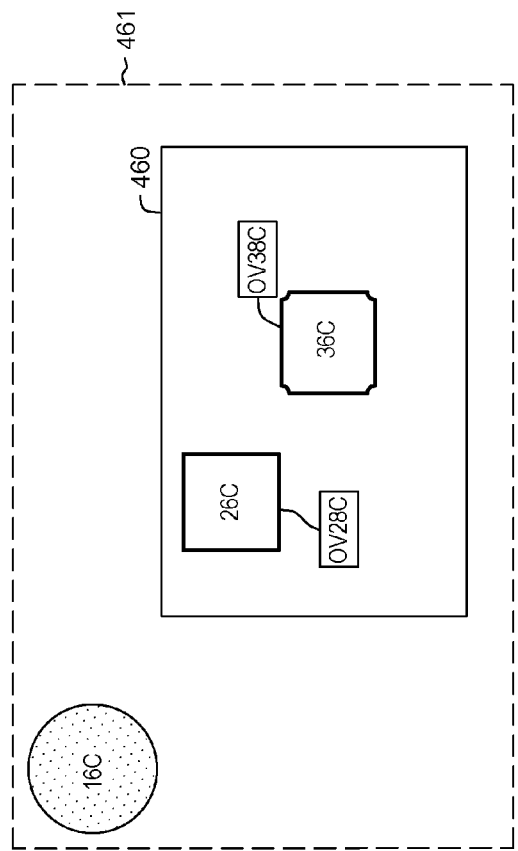

AUGMENTED REALITY OVERLAYS BASED ON AN OPTICALLY ZOOMED INPUT

BACKGROUND OF THE INVENTION

The present invention relates generally to the field of view management for annotations in display systems, and more particularly to managing information overlays depicted in near-eye displays and augmented reality displays.

Augmented reality (AR) is a view of a physical, real-world environment with elements augmented by a computer-generated sensory input. Computer-generated sensory inputs can include sound, video, graphics, or global positioning system (GPS) data. Generally, augmentation is in real-time and in semantic context with environmental elements. Often, AR display devices can align virtual information with the physical world. In some examples, virtual information is layered over the physical-world view on a computing device. The virtual information layer is an overlay. The content may, for example, comprise text elements, images, 3-dimensional models, or any other kind of information adapted for graphical representation in the display of the device.

Various electronic (e.g., computing) devices can include AR capabilities and/or display AR content, such as smartphones, smart glasses, a heads-up displays, a digital helmet, etc. Some AR devices are self-contained computing devices that can wirelessly access content stored, for example, on the Internet. Other AR devices, such as an AR headset or AR contact lenses may require power, additional computational capabilities, and/or system (e.g., Internet) access that is supplied by various adapters (e.g., a power adapter) and/or computing devices, such as a smartphone, a game console, a laptop computer, a desktop computer, etc.

SUMMARY

According to aspects of the present invention, there is a method, computer program product, and/or system for managing a content overlay. The method includes one or more computer processors identifying a first image and a second image from an augmented reality (AR) device. The method further includes one or more computer processors identifying a first element of interest within the first image. The method further includes one or more computer processors associating a corresponding first AR content overlay for the first element of interest. The method further includes one or more computer processors determining one or more differences between the first image and the second image, wherein the second image includes at least the first element of interest. The method further includes one or more computer processors modifying a position of at least the first AR content overlay based, at least in part, on the one or more differences between the first image and the second image.

BRIEF DESCRIPTION OF THE DRAWINGS

FIG. 4d depicts another illustrative example of an AR device responding to an observation of a user, in accordance with an embodiment of the present invention.

FIG. 4e depicts an illustrative example of a response of an AR device to a change of orientation and an optically zoomed camera image of an area of observation of a user, in accordance with an embodiment of the present invention.

FIG. 4f depicts an illustrative example of changes to content overlays and visual elements within a field of view of a user, based on a change of orientation of an AR device and an optically zoomed camera image of an area of observation of a user, in accordance with an embodiment of the present invention.

DETAILED DESCRIPTION

Figure 1:
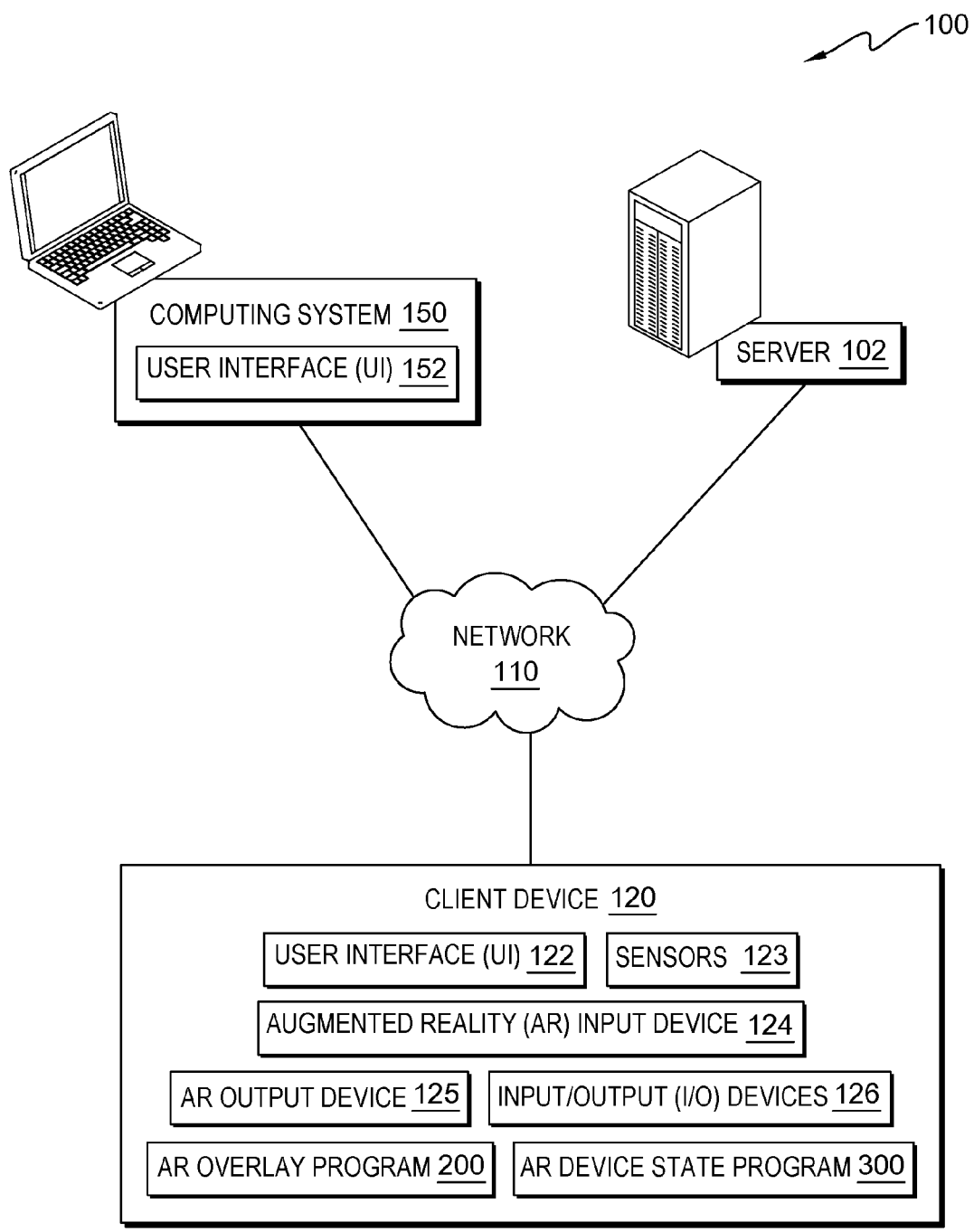
FIG. 1 illustrates a distributed computing environment, in accordance with an embodiment of the present invention.

Augmented reality (AR) displays enable a user to merge real world experiences with a virtual world via a visual overlay to supplement what the user views. Connection to various databases, via a computer network, allows AR displays to add information to the user's view through AR content objects (e.g., content overlays). For example, if a user views a traffic pattern from an overhead perspective, the AR overlays may provide street names, vehicle models, vehicle speeds, etc. An embodiment of the present invention recognizes that AR overlays can enhance user experiences. Some AR overlays are produced based on markers associated with physical indicators in the real world. Other AR overlays are produced based on image and/or location recognition of elements of interest within a digital video feed. Embodiments of the present invention also recognize that high-resolution images may be digitally magnified (i.e., zoomed) to provide a user with an enhanced view of a smaller area. However, some AR content overlays may be lost when some or all of an element of interest is lost or obscured based on: optically, mechanically, and/or digitally increasing the magnification of a field of view of a user. Additionally, if one or more markers leaves the field of view via movement or a change in magnification, an element of interest may not be identifiable and therefore loses an associated AR content overlay.

Embodiments of the present invention also recognize that content objects (e.g., AR content overlays) appear in a live video stream on top of a real-world object via a mechanism called "tracking." Augmented reality can utilize various tracking techniques, such as "marker- based" tracking, markerless tracking, "location-based" tracking, or a combination thereof. Marker-based tracking includes a computing device presenting a live video stream to a display; at the same time, the computing device analyzes the live video stream to detect predefined patterns. If such a pattern is recognized, AR content overlays, herein referred to as content overlays, related to this pattern are overlaid (e.g., superimposed) in the video stream. Markerless tracking includes a computing device analyzing the live video stream and identifying features (e.g., visual elements, objects, elements of interest, etc.) in real-time and utilizing the identified feature as references for other elements within the video stream. Location-based tracking comprises reading the geographical location of a mobile device via global positioning system (GPS) coordinates and/or wireless network information. Geographical location information is combined with inertial measurement data and positional data to determine objects visible in the field of view of a built-in camera at a certain moment in time and to overlay recognized objects in the live camera video stream with content related to the recognized objects (e.g., elements of interest).

Embodiments of the present invention can be utilized in an AR device that includes one or more AR input devices (e.g., digital cameras, video cameras, etc.) that are capable of optically magnifying a field of view. Embodiments of the present invention utilize state data (e.g., location, orientation, camera magnification, etc.) associated with an AR device to determine which elements of interest remain in the field of view of a user and determine which content overlays are displayed. Embodiments of the present invention input various data of various AR device states to: trigonometric, geometric, algebraic, arithmetic, optical, and/or other equations that calculate changes to a field of view and/or within a field of view (e.g., positions of elements). Embodiments of the present invention utilize the calculated changes to determine which elements of interest are present in a field of view of a user and to display one or more corresponding content overlays for the elements of interest.

Various embodiments of the present invention utilize one or more physical elements and/or elements of interest within a field of view of a camera and/or video stream as markers (e.g., virtual markers, location anchors, etc.) that are used as references and/or to track other visual elements (e.g., elements of interest). Some embodiments of the present invention combine tracking information corresponding to one or more elements of interest and/or markers, with AR device state data to determine (e.g., calculate) which elements of interest are present in a field of view (e.g., of a user) and display one or more corresponding content overlays for the elements of interest. Other embodiments of the present utilize tracking information to estimate a location for an element of interest that is obscured and/or moves out of a field of view.

Some embodiments of the present invention identify elements of interest within a digital video stream based on user preferences (e.g., search criteria, rules, etc.). One embodiment of the present invention utilizes information included with an AR device and/or base unit to identify one or more elements of interest within an area of observation. Another embodiment of the present invention may utilize information available from a networked source (e.g., the Internet, a server of a service provider, a government server, etc.) to identify one or more elements of interest within an area of observation. Information (e.g., content overlays) associated with an element of interest can be displayed (e.g., in a callout, in a window, etc.) on an AR display (e.g., smart glasses, AR headset, etc.) in proximity to an element of interest. A content overlay can appear based on a user preference and/or when a user interacts with (e.g., via a voice command, via a haptic input, via a virtual input device, etc.) an element of interest.

The present invention will now be described in detail with reference to the Figures. FIG. 1 is a functional block diagram illustrating distributed computing environment 100, in accordance with an embodiment of the present invention. In an embodiment, distributed computing environment 100 includes: server 102, client device 120, and computing system 150, all interconnected over network 110. Many modifications to the depicted environment may be made by those skilled in the art without departing from the scope of the invention as recited by the claims.

Server 102, client device 120, and computing system 150 may be laptop computers, tablet computers, netbook computers, personal computers (PC), desktop computers, personal digital assistants (PDA), smart phones, wearable devices (e.g., smart glasses, smart watches, AR headsets, etc.), or any programmable computer systems known in the art. Wearable computers are especially useful for applications that require more complex computational support than just hardware-coded logics. In certain embodiments, server 102, client device 120, and computing system 150 represent computer systems utilizing clustered computers and components (e.g., database server computers, application server computers, etc.) that act as a single pool of seamless resources when accessed through network 110, as is common in data centers and with cloud-computing applications. In general, server 102, client device 120, and computing system 150 are representative of any programmable electronic device or combination of programmable electronic devices capable of executing machine readable program instructions and communicating via network 110. Server 102, client device 120, and computing system 150 may include components, as depicted and described in further detail with respect to FIG. 5, in accordance with embodiments of the present invention.

Server 102 may include various webpages, programs, and databases, such as an image recognition program, a terrain mapping program, a wireless tracking program, a geotagged image database, a geolocation database, etc. (not shown).

Client device 120 may include user interface (UI) 122, sensors 123, one or more instance of augmented reality (AR) input device 124, one or more instances of AR output device 125, input/output (I/O) devices 126, AR overlay program 200, AR device state program 300, and various programs and data (not shown). Examples of programs that client device 120 may potentially include are: an augmented reality (AR) program, a web browser, an image processing software, a facial recognition software, a GPS program, a computer-aided design software, a voice recognition software, etc. Examples of data that client device 120 may include, but are not limited to are: user preferences, such as element of interest selection criteria; AR overlay formatting such as positioning, size, style, font, content control (e.g., nesting, scrolling, hyperlink access, etc.); client device 120 control information (e.g., video frame rates, voice control commands, virtual I/O device parameters, etc.); security and access information (e.g., AR input transmission, remote control authentication, etc.); AR input device 124 parameters and state data; state data of client device 120; etc. In addition, client device 120 may buffer and/or aggregate tracking information to determine changes among AR input images. In some embodiments, client device 120 utilizes one or more programs and/or databases included on client device 120. In other embodiments, client device 120 communicates data via network 110 and remotely processes the data on another computing system, such as server 102 and/or computing system 150.

In an embodiment, client device 120 is a self-contained, stand-alone computing device, such as an AR headset, a smartphone, a tablet computer, etc. In various embodiments, client device 120 may be a component, such as an AR headset, a heads-up display, smart glasses, a wearable device, etc. that is linked and/or networked to another computing device, such as computing system 150. In an alternative embodiment, client device 120 is one or more electronic devices (e.g., digital cameras, digital binoculars, etc.) that is capable of interfacing, via network 110, with one or more computing devices (e.g., computing system 150) to perform as an AR device.

In one embodiment, server 102, client device 120, and computing system 150 communicate through network 110. Network 110 can be, for example, a local area network (LAN), a telecommunications network, a wireless local area network (WLAN), such as an intranet, a wide area network (WAN), such as the Internet, or any combination of the previous, and can include wired, wireless, or fiber optic connections. In general, network 110 can be any combination of connections and protocols that will support communications between server 102, client device 120, and computing system 150, in accordance with embodiments of the present invention. In another embodiment, network 110 operates locally via wired, wireless, or optical connections and can be any combination of connections and protocols (e.g., personal area network (PAN), near field communication (NFC), laser, infrared, ultrasonic, etc.).

UI 122 accepts input from a plurality of I/O devices (not shown) including, but not limited to, a tactile sensor interface (e.g., a touch screen, a touchpad) or a natural user interface (e.g., voice control unit, motion capture device, vision tracking, etc.). An I/O device interfacing with UI 122 may be connected to client device 120 which may operate utilizing a wired connection, such as a universal serial bus port (USB™ port) or wireless network communications (e.g., infrared, NFC, etc.). For example, an I/O device may be a peripheral that provides input from a user, such as a keyboard, a mouse, a trackball, or a click wheel. In some embodiments, UI 122 accepts input from a user via a virtual I/O device. In an example, AR output device 125 superimposes a virtual I/O device, such as keyboard in a field of view of a user and an AR program (not shown) analyzes data of AR input device 124 to determine actions (e.g., keystrokes) of a user associated with the virtual I/O device, and communicates the determined actions to UI 122.

In other embodiments, a user of client device 120 can interact with UI 122 via a singular interface device, such as a display (e.g., a touch screen). The interface device of client device 120 may act as both an input to a graphical user interface (GUI) and an output device (e.g., a display) presenting a plurality of icons associated with software applications or images depicting the executing software application. In various embodiments, UI 122 may be a web user interface (WUI) and can display text, documents, web browser windows, user options, application interfaces, etc.

In one embodiment, sensors 123 are sensors that client device 120 can utilize to determine position (e.g., compass direction), and orientation (e.g. up, down, tilt, etc.) of a user and/or AR input device 124. In another embodiment, sensors 123 include inertial tracking devices, such accelerometers, gyroscopes, magnetometers, etc., which determine movement of client device 120 (e.g., an AR headset). In various embodiments, sensors 123 may also include: pressure sensors (e.g., a barometer, an altimeter), illumination sensors (e.g., light meters), proximity sensors (e.g., range finders), a temperature sensor, a humidity sensor, a gravity sensor, electromagnetic spectrum (EM) sensors, etc. In a further embodiment, client device 120 monitors and/or analyzes outputs from sensors 123 and may communicate a flag (e.g., a warning, an information change, etc.) to AR overlay program 200, AR device state program 300, a user of client device 120, and/or a user of computing system 150.

AR input device 124 images an area of observation (e.g., an object, a scene, a location, etc.) of one or more users of client device 120. In one embodiment, AR input device 124 is a digital camera that includes hardware and/or mechanisms that enables AR input device 124 to optically magnify (i.e., zoom) an area of observation. In some embodiments, AR input device 124 includes additional mechanical and/or electronics components. In one scenario, AR input device 124 may include components, such as, but not limited to, positioning devices (e.g., flexures, gimbals, motors, etc.), a variable aperture iris (e.g., f-stop), an image stabilization system, etc. In another scenario, AR input device 124 includes electronics that determine state data (i.e., values) for one or more components, such as magnification, position (e.g., deflection) in one or more axis, focal distance, etc.

In other embodiments, client device 120 includes two or more instances of AR input device 124. For example, client device 120 may include a plurality instances of AR input device 124, such as, but not limited to, a wide-field digital camera, an infrared (IR) camera, an ultraviolet camera, a light-amplification camera (e.g., night vision device), a plenoptic camera, etc. In an alternative embodiment, AR input device 124 may image an area of observation based on a non-optical technology, such as an acoustic technology (e.g., echo-location, sonar, etc.), a radio frequency technology, etc.

AR output device 125 displays (e.g., projects, superimposes) one or more AR elements (e.g., markers, overlays, AR images, virtual I/O devices, etc.) in a field of view of a user of client device 120. In some embodiments, AR output device 125 projects one or more AR elements on a surface, such as an eyeglass lens, a visor, a windshield, a screen, etc., which is viewed by a user of client device 120. In other embodiments, AR output device 125 is a digital construct that is transmitted to a user of another computing system. In a scenario, UI 152 of computing system 150 emulates AR output device 125. In an example, UI 152 displays an image from AR input device 124 and various AR elements as presented to a user of client device 120 by AR output device 125.

In one embodiment, AR output device 125 may be in a line-of-sight configuration for a user of client device 120. In one scenario, AR output device 125 is embedded within an eyeglass lens, a visor, a windshield, a periscope, etc. In an example, AR output device 125 may be a transparent thin-film transistor and/or liquid crystal display (LCD) incorporated within or applied on top of an eyeglass lens, a visor, etc. that a user looks through to see an area of observation. In another scenario, AR output device 125 may be a display such as a display of a smartphone, a tablet computer, etc. For example, client device 120 may be a tablet computer that includes two instances of AR input device 124 (e.g., two digital cameras) and an LCD emulating AR output device 125. The LCD may depict an area of observation is split-screen mode. In this example, an AR program of client device 120 may display a magnified view output by one AR input device 124 in the left split screen and an emulated, unmagnified view that includes various AR elements and content in the right split screen.

In an alternative embodiment, an AR system includes a plurality of electronic and computing devices (e.g., two or more instances of client device 120, one or more instance of computing system 150, etc.). AR output device 125 may be a larger screen (e.g., monitor, display, etc.) that is divided into multiple views. In an example, AR output device 125 is divided into pairs of areas of observation across a screen. In this example, the upper image of a pair of images is associated with an instance of AR input device 124 operating without magnification, and the lower image of the pair of images is associated with a magnified (i.e., zoomed) instance of another instance of AR input device 124.

I/O devices 126 may include: a GPS receiver, one or more microphones, one or more speakers (e.g., headphones, earbuds, etc.), one or more auxiliary sensors that are not integrated within client device 120, a peripheral device, etc. In one example, I/O devices 126 includes one or more sampling/analytical sensors, such as a chemical sensor. In another example, 110 devices 126 may include a haptic device, such as a cyber-glove.

AR overlay program 200 identifies elements of interest (e.g., visual elements) within an area observed by a user of client device 120. In an embodiment, AR overlay program 200 analyzes a field of view of a user of client device 120 based on a field of view constrained by one or more components of client device 120, such as an area of a visor, support structures (e.g., mounting hardware), and/or a field of view of an instance of AR input device 124 (e.g., a camera). In another embodiment, AR overlay program 200 determines one or more AR content overlays for each element of interest within an area of observation of a user that is input to AR input device 124. In some embodiments, AR overlay program 200 formats content overlays (e.g., AR content overlays) for the elements of interest, based on one or more user preferences, for display by AR output device 125. In other embodiments, AR overlay program 200 utilizes one or more functions of an AR program (not shown) executing on client device 120 to format and/or display content overlays.

In an embodiment, AR overlay program 200 utilizes markers to determine content overlays. In some embodiments, AR overlay program 200 defines one or more elements of interest and/or one or more other elements within an area of observation as markers to determine changes between one image/video frame of AR input device 124 and another image/video frame of AR input device 124. In various embodiments, if AR overlay program 200 determines that a change occurs between images/video frames of AR input device 124, then AR overlay program 200 may execute an instance of AR device state program 300 to modify an output (e.g., content overlay locations) of AR output device 125. In addition, AR overlay program 200 may communicate tracking information to AR device state program 300.

AR device state program 300 determines state data associated with client device 120. In one embodiment, AR device state program 300 determines state data associated with AR input device 124. In another embodiment, AR device state program 300 determines state data associated with one or more sensors of sensors 123. In some embodiments, AR device state program 300 determines state data associated with client device 120 relative to a user and/or an area of observation viewed by the user. In various embodiments, AR device state program 300 interfaces with AR overlay program 200 to obtain tracking information in response to a change to an image received from AR input device 124. In another embodiment, AR device state program 300 may respond to a change to an image received from AR input device 124 and changes one or more content overlays associated with an element of interest and modifying one or more elements displayed by AR output device 125.

In other embodiments, AR device state program 300 utilizes one or more functions of an AR program (not shown) executing on client device 120 to format/and/or display content overlays. In an alternative embodiment, AR device state program interfaces with an AR program executing on client device 120 to position AR overlays and/or content overlays within an emulated instance of AR output device 125, such as UI 152 of computing system 150.

Computing system 150 includes UI 152 and various programs (not shown). Examples of programs that computing system 150 may potentially include are: an augmented reality program, a web browser, text messaging software, image processing software, facial recognition software, GPS software, computer-aided design software, voice recognition software, etc. In some embodiments, computing system 150 includes an instance of AR overlay program 200 and AR device state program 300; and interfaces with and/or supports client device 120. In other embodiments, computing system 150 is a computing system of another user that communicates with a user of client device 120. In addition, computing system may buffer and/or aggregate tracking information to determine changes among AR input images received from client device 120.

In one embodiment, UI 152 is a communication program that enables a user of computing system 150 to view an area of observation seen by a user of client device 120. In various embodiments, UI 152 may display an output of AR output device 125. In another embodiment, UI 152 is substantially similar to UI 122. In some embodiments, UI 152 enables a user of computing system 150 to control of one or more actions of client device 120 remotely, such as modifying the magnification of AR input device 124 and/or inducing a haptic event (e.g., compensating for and/or dampening a movement of a user). In other embodiments, UI 152 enables a user of computing system 150 to communicate with a user of client device 120.

Figure 2:
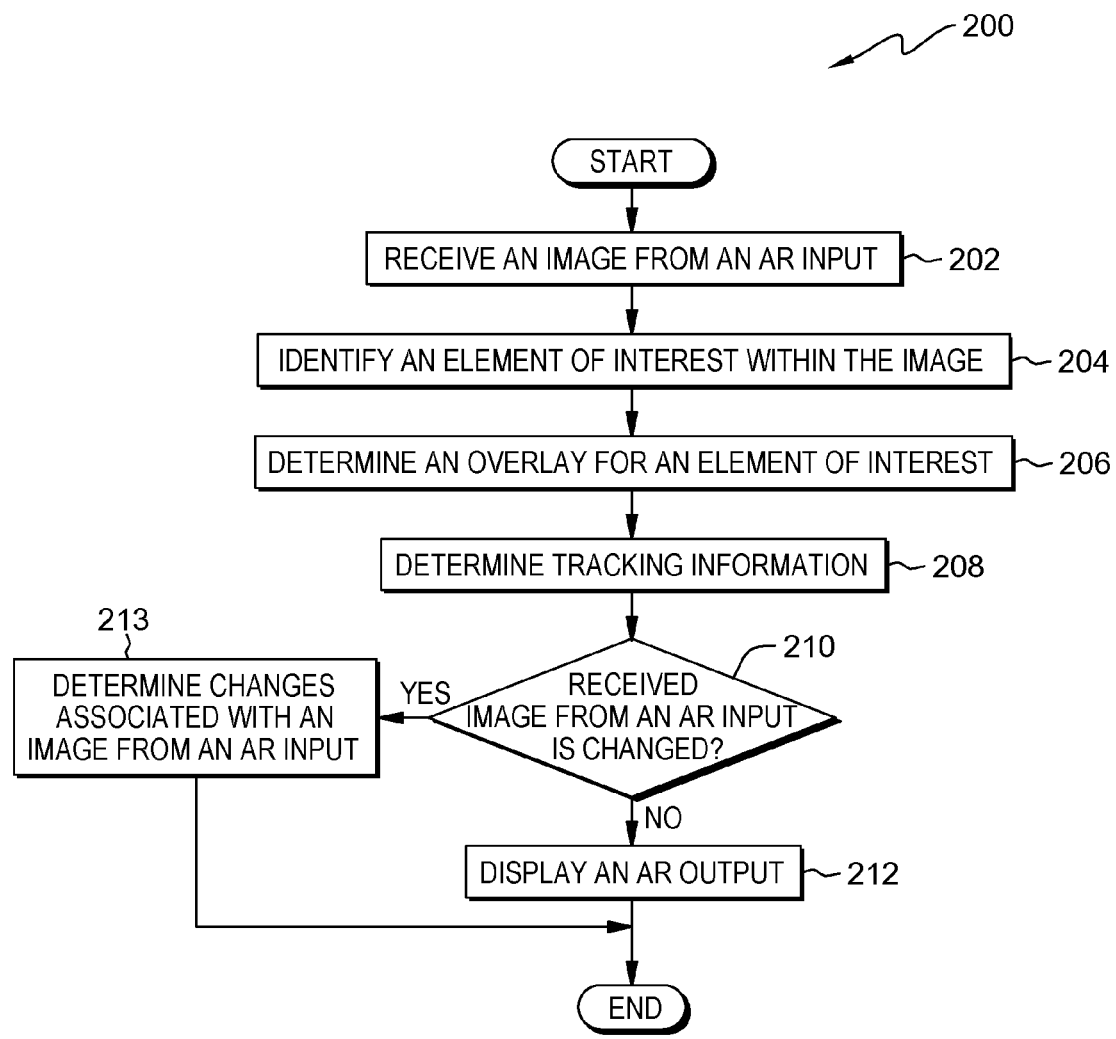
FIG. 2 depicts a flowchart of the operational steps of an augmented reality (AR) overlay program, in accordance with an embodiment of the present invention.

FIG. 2 is a flowchart depicting operational steps for AR overlay program 200, a program that determines and displays one or more content overlays to an element of interest within an AR environment, in accordance with embodiments of the present invention.

In step 202, AR overlay program 200 receives an image from an AR input. In one embodiment, AR overlay program 200 receives an image (e.g., one or more frames of a digital video stream, a digital picture, etc.) from AR input device 124 of client device 120. In another embodiment, AR overlay program 200 receives an image that is digitized, by an ancillary program (not shown), from an analog instance of AR input device 124. In some embodiments, AR overlay program 200 obtains additional information associated with an image from one or more sensors 123 and/or one or more I/O devices 126, such as proximity (e.g., distance) information for elements of an image, wireless signals, GPS coordinates, sounds (e.g., music, conversations, background noise, etc.), etc.

In other embodiments, AR overlay program 200 receives a composite image (e.g., two or more digital video images, two or more digital camera images) from multiple instances of AR input device 124. In one example, AR overlay program 200 receives a composite image, such as a panoramic view from a plurality of instances of AR input device 124. In another example, AR overlay program 200 receives a composite image, such as a tiled image from a plurality of instances of AR input device 124. In some instances, AR overlay program 200 receives a tiled image is comprised of abutted images. In other instances, AR overlay program 200 receives a tiled image is comprised of images that overlap.

In another example, AR overlay program 200 receives a composite image comprised of the same area of observation, in which each image of the area of observation depicts a different focal plane/distance.

In a further embodiment, AR overlay program 200 receives an image from a non- visible light AR input device 124, such as a thermal imaging camera, a sonic imaging device (e.g., echo-location system), etc. In an alternative embodiment, AR overlay program 200 receives an image from another source via network 110. In one example, AR overlay program 200 receives an image/video stream from computing system 150, where a user of computing system 150 is collaborating with a user of client device 120. In another example, AR overlay program 200 receives an image/video stream from a video feed accessible via network 110, such as security cameras, live Internet video, a telepresence robot, etc.

In step 204, AR overlay program 200 identifies an element of interest within the image. In one embodiment, AR overlay program 200 identifies the element of interest within the received image of a digital video stream, based on a user (e.g., user of client device 120, user of computing system 150) input and/or user preferences. In one scenario, AR overlay program 200 identifies an element of interest (e.g., a visual element (VE)), within the received image, based on a voice command. In another scenario, AR overlay program 200 identifies an element of interest, within the received image, based on a user of client device 120 utilizing hand gestures, such as pointing at an element, manipulating a virtual I/O device, etc. In another scenario, AR overlay program 200 identifies an element of interest, within the received image, based on a user of computing system 150 identifying and/or selecting one or more elements of interest.

In some embodiments, AR overlay program 200 identifies one or more elements of interest within the received image based on user preferences (e.g., search criteria, rules, etc.), such as such models of cars, or flowers currently blooming. In other embodiments, AR overlay program 200 utilizes information available from a networked source (e.g., server 102, the Internet, a server of a service provider, a government server, etc.) to identify one or more elements of interest within an area of observation. In one example, AR overlay program 200 identifies one or more elements of interest within an area of observation based on information downloaded from server 102, such as historic buildings in proximity of GPS coordinates of client device 120. In another example, AR overlay program 200 communicates the received image to a networked source, for the networked source to determine information associated with an element of interest, and for the networked source to communicate the determined information to AR overlay program 200. In various embodiments, AR overlay program 200 may communicate an image with another networked computing system (e.g., server 102, computing system 150) to determine an element of interest.

In one alternative embodiment, AR overlay program 200 identifies an element of interest within the received image (e.g., received via AR input device 124), based on additional information associated with an element of an image, such a sound, a wireless signal, an Internet update (e.g., a social media flag, a news item, etc.), a response to a sensor 123 flag (e.g., warning), etc. In another alternative embodiment, AR overlay program 200 identifies an element of interest, within the received image, such as a sound and/or VE that a user of client device 120 cannot identify without augmentation (e.g., increased magnification, flagging by a sensor 123, etc.) and/or information of one or more I/O devices 126.

In step 206, AR overlay program 200 determines an overlay for an element of interest. In one embodiment, AR overlay program 200 determines a content overlay for an element of interest within the received image, based on information stored on client device 120. In another embodiment, AR overlay program 200 determines a content overlay for an element of interest based on information stored on computing system 150. In various embodiments, AR overlay program 200 determines an overlay for an element of interest from information available from another source accessible via network 110, such as server 102, the Internet, etc. In some embodiments, AR overlay program 200 obtains multiple content overlays for an element of interest. In one scenario, AR overlay program 200 utilizes each content overlay associated with an element of interest. In another scenario, AR overlay program 200 filters the multiple content overlays associated with an element of interest based on one or more user preferences and/or relevance of AR overlay content to one or more other elements of interest within an image of an area of observation.

In step 208, AR overlay program 200 determines tracking information. In one embodiment, AR overlay program 200 determines tracking information for a received image based on markerless tracking (e.g., GPS coordinates, an indoor/outdoor positioning system, one or more wireless communication nodes, etc.) and/or an orientation of client device 120. In another embodiment, AR overlay program 200 determines tracking information based on information associated with one or more markers. In one scenario, AR overlay program 200 utilizes markers defined within a received image, such as placards, sigils, a QR code, etc., for determining tracking information. In another scenario, AR overlay program 200 defines one or more elements within a received image as a marker (e.g., a virtual marker, location anchor, etc.). In some scenarios, AR overlay program 200 may include one or more elements of interest, of an area of observation, as markers within a received image.

In decision step 210, AR overlay program 200 determines whether a received image from an AR input is changed. In one embodiment, AR overlay program 200 constrains a determination of change of the received image (e.g., from AR input device 124) to changes to identified elements of interest. In an example, AR overlay program 200 identifies elements within an area of observation that are not elements of interest as background elements; and that background elements do not affect a determination of change to a received image. In another embodiment, AR overlay program 200 determines that a received image is unchanged when all elements of interest remain within the field of view (FOV) of AR input device 124. In an example (referring to FIG. 4a), area of observation 401 (long dash, dot dot boarded box) includes FOV 400 and three elements of interest: VE 10, VE 20, and VE 30. In this example, client device 120 may move (e.g., is worn by a user that is walking). If VE 10, VE 20, and VE 30 remain visible within FOV 400, then AR overlay program 200 determines that an image is unchanged.

In some embodiments, AR overlay program 200 determines that an image is changed when at least one element of interest changes size and/or position relative to one or more other elements of interest within a FOV of an AR input device. In an example, AR overlay program 200 determines that an image is changed based on information from sensors 123, such as changes in proximity data associated with two or more elements of interest. In various embodiments, AR overlay program 200 determines that an image is changed if one or more elements of interest of an area of observation cannot be identified within a FOV of an AR input device. In one scenario, AR overlay program 200 may determine that an element of interest is in a FOV; however, the element of interest is obscured. In another scenario, AR overlay program 200 determines that an image is changed if one or more elements of interest leaves a FOV of an AR input device.

In decision step 210, responsive to determining that a received image from an AR input is unchanged (No branch, decision step 210), AR overlay program 200 displays an AR output (step 212).

In step 212, AR overlay program 200 displays an AR output. AR overlay program 200 displays and/or renders various AR elements within a FOV of a user of client device 120 utilizing AR output device 125. In one embodiment, AR overlay program 200 includes one or more content overlays associated with an element of interest within an AR output. In some embodiments, if AR overlay program 200 determines that an element of interest moves in a FOV, then AR overlay program 200 moves an AR overlay to track an element of interest. In another embodiment, AR overlay program 200 may include an icon that indicates a presence of an AR overlay for an element of interest without displaying the AR overlay until the icon and/or element of interest is selected by a user.

In other embodiments, AR overlay program 200 includes additional AR elements that may not be associated with an element of interest, such as, but not limited to: one or more text messages, a virtual I/O device (e.g., a command interface for client device 120, a tool bar, etc.), one or more AR windows (e.g., a video conference session, a digital map, a web browser, a schematic, etc.), etc. In some scenarios, AR overlay program 200 may modify an AR overlay to include a connector and/or an arrow that indicates an element of interest exists "behind" another AR element (e.g., an AR window). In various embodiments, AR overlay program 200 communicates a composite image to computing system 150, such as an image from AR input device 124 and/or an image of AR output device 125, such as the FOV described in further detail in FIG. 4b.

Referring to decision step 210, responsive to determining that a received image from an AR input is changed (Yes branch, decision step 210), AR overlay program 200 determines changes associated with an image from an AR input (step 213).

In step 213, AR overlay program 200 determines changes associated with an image from an AR input. In one embodiment, AR overlay program 200 determines changes to an image from an AR input device, such as AR input device 124, based on one or more tracking techniques. In one example, AR overlay program 200 may determine that a user of client device 120 pans (e.g., a rotational change of an observation) based on a tracking technique such as recursive tracking (e.g., edge based tracking, optical flow based tracking, etc.). In another example, AR overlay program 200 utilizes tracking information to determine that an element of interest is in a field of view of AR input device 124; however, the element of interest is partially or fully obscured (i.e., hidden) by another object, such as a person walking across the field of view of a user of client device 120. In response to determining that an element of interest is in the field of view of AR input device 124, AR overlay program 200 estimates a position for the element of interest and associates an overlay based on the estimated position of the element of interest.

In another embodiment, AR overlay program 200 determines changes to an image based on changes to data of sensors 123. In various embodiments, AR overlay program 200 executes and instance of AR device state program 300 that quantifies changes between received images and associated elements of interest, via calculations and/or estimations. In addition, AR overlay program 200 may communicate tracking information to AR device state program 300, which is also utilized to quantify changes between received images and associated elements of interest. AR overlay program 200 may also transfer control to AR device state program 300 to update and/or modify, based on one or more changes between received images, one or more content overlays displayed by AR output device 125.

Figure 3:
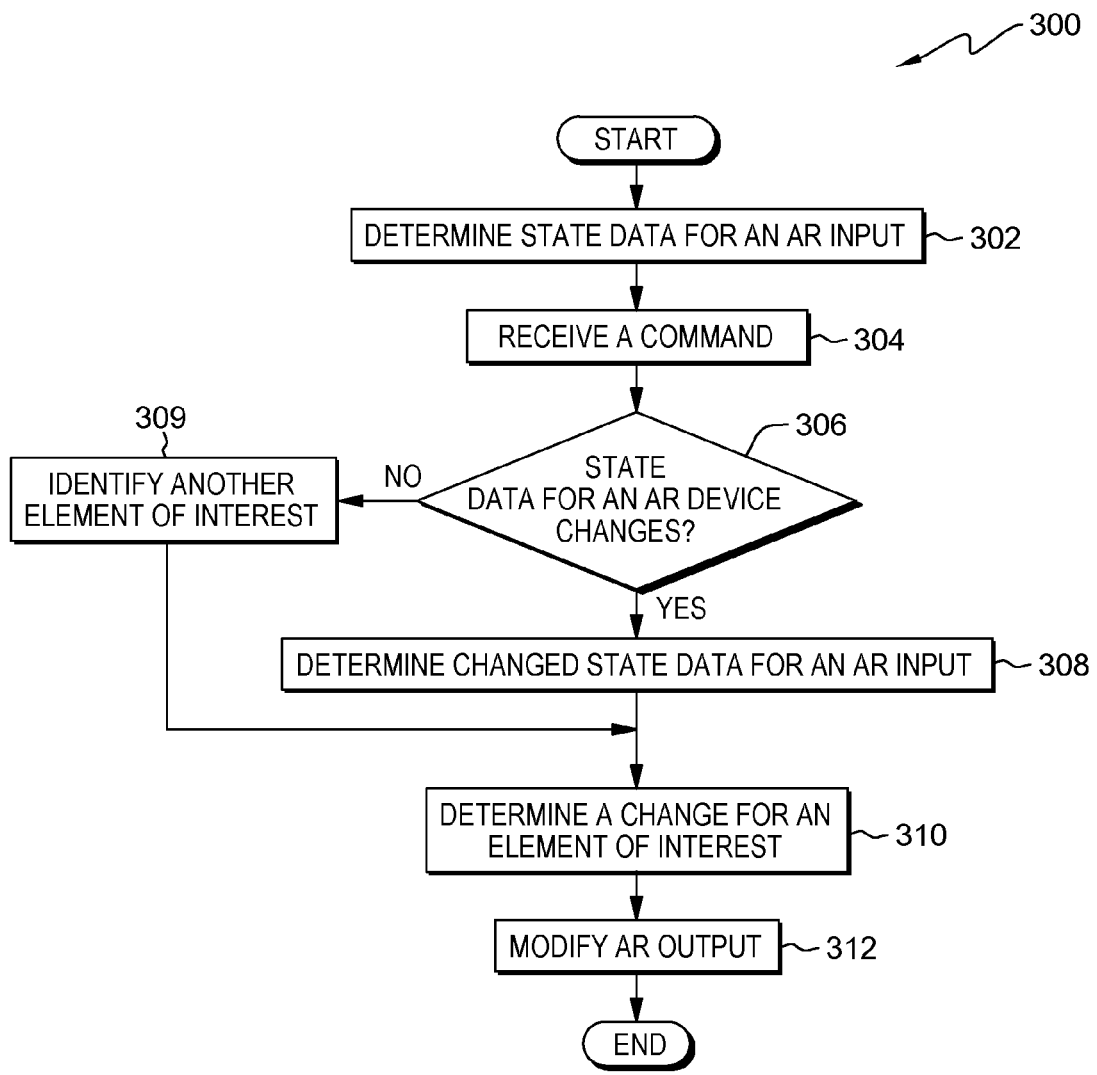
FIG. 3 depicts a flowchart of the operational steps of an AR device state program, in accordance with an embodiment of the present invention.

FIG. 3 is a flowchart depicting operational steps for AR device state program 300, a program for determining state data for an AR device and for determining an effect of the state data on one or more content overlays, in accordance with embodiments of the present invention. In one embodiment, AR device state program 300 determines AR device state data in response to an external command. In another embodiment, AR device state program 300 modifies an AR output in response to changes in AR device state data. In various embodiments, AR device state program 300 interfaces with AR overlay program 200. For example, if AR overlay program 200 determines that a change to an image is associated with an AR input device, then AR device state program 300 interfaces with AR overlay program 200.

In step 302, AR device state program 300 determines state data for an AR input. In one embodiment, AR device state program 300 determines state data for an instance of AR input device 124, for example, magnification, deflection from a FOV of a user (e.g., flexure position, gimbal rotation, etc.), etc.

In various embodiments, AR device state program 300 determines state data associated with a device that includes AR input device 124, such as client device 120. In one example, AR device state program 300 may determine state data for client device 120, such as position (Cartesian coordinates: X, Y, and Z), intrinsic rotations (e.g., roll, pitch, and yaw), proximity to an element of interest, etc. Additionally, AR device state program 300 may derive state data that is associated with a device that includes AR input device 124, such as velocity, acceleration, etc. In a further embodiment, AR device state program 300 may determine state data for one or more other sources associated with client device 120, such as a different AR input device 124, sensors 123, I/O devices 126, etc.

In an alternative embodiment, in addition to state data, AR device state program 300 obtains tracking information from AR overlay program 200 for one or more elements of interest within an area of observation. In one scenario, AR device state program 300 obtains tracking information that identifies changes in position of one or more elements of interest within an area of observation. In one example, AR device state program 300 may obtain tracking information that indicates whether an element of interest is moving at a constant rate or a variable rate relative to another element of interest. In another example, AR device state program 300 may obtain tracking information (e.g., a change in size) that indicates whether an element of interest is moving relative to client device 120, such as a change of proximity. In some instances, AR device state program 300 may determine that an element of interest changes size without appearing to move relative to the other element of interest based on a change of proximity.

In step 304, AR device state program 300 receives a command. In one embodiment, AR device state program 300 receives a command from an external source, such as computing system 150. In one scenario, AR device state program 300 determines that client device 120 receives a control command via network 110 that changes the magnification of AR input device 124, such as "change AR input device 124 magnification to 2×." In another scenario, AR device state program 300 receives an external command that is a communication (e.g., text message, a spoken message, etc.) between a user of computing system 150 and a user of client device 120. In an example (described in further detail with respect to FIGS. 4a, 4b, and 4c), AR device state program 300 determines that a user of computing system 150 communicates a text message to client device 120 and in response, a user of client device 120, changes the magnification of AR input device 124. In another embodiment, AR device state program 300 receives a command from a user of client device 120.

In an alternative embodiment, AR device state program 300 receives an external command that indicates that a user of client device 120 is instructed to utilize/include a different instance of AR input device 124, sensors 123, and/or I/O devices 126. In one example, AR device state program 300 receives an external command (e.g., text message) to utilize I/O devices 126 (e.g., parabolic microphone) to obtain sound based information (e.g., voices, activity noises, etc.) associated with an element of interest. In another example, AR device state program 300 receives an external command to utilize a second AR input device (e.g., a thermal imaging camera) to determine whether an element of interest is "running hot."

In some embodiments, AR device state program 300 receives a command that does not affect client device 120 (e.g., change state information). In one example, AR device state program 300 receives a command that indicates that a user of client device 120 removes and/or deselects one or more elements of interest from an area of observation and includes and/or selects one or more different elements of interest.

In decision step 306, AR device state program 300 determines whether state data for an AR device changes. In one embodiment, AR device state program 300 determines that state data for an AR device changes based on control codes included in an external command that is received. In another embodiment, AR device state program 300 determines state data for an AR device changes based on identifying changes to one or more device states of client device 120 between one AR input image and another AR input image. Responsive to determining that state data for an AR device changes (Yes branch, decision step 306), AR device state program 300 determines changed state data for an AR input (step 308).

In step 308, AR device state program 300 determines changed state data for an AR input. In one embodiment, AR device state program 300 determines changed stated data for AR input device 124, such as magnification, flexure movements (e.g., X/Y/Z translations), angular movements (e.g., gimbal orientation/rotation), insertion of an optical filter (e.g., polarizing filter to reduce glare), etc. In another embodiment, AR device state program 300 determines changes to state data associated with client device 120, such as movement (e.g., velocity), orientation changes (e.g., translations, rotations), proximity to one or more elements of interest, etc. In some embodiments, AR device state program 300 determines that changes to state data of an AR input are associated with utilizing/including a different instance of AR input device 124, sensors 123, and/or I/O devices 126. In various examples, AR device state program 300 determines that additional state data (i.e., new information) is obtained by client device 120, a different instance of AR input device 124, sensors 123, and/or I/O devices 126.

Referring to decision step 306, responsive to determining that state data for an AR device does not change (No branch, decision step 306), AR device state program 300 determines another element of interest (step 309).

In step 309, AR device state program 300 identifies another element of interest. In one embodiment, AR device state program 300 determines another element of interest within an area of observation by parsing (e.g., translating) a received external command. In an example, AR device state program 300 may utilize speech recognition and/or text recognition to determine data relevant (e.g., shape, color, etc.) to identifying one or more other elements of interest within an area of observation. In an alternative embodiment, AR device state program 300 utilizes speech recognition and/or text recognition to determine data relevant (e.g., shape, color, etc.) to identifying one or more elements of interest that are excluded from an area of observation.

In various embodiments, AR device state program 300 identifies another element of interest, within a FOV, based on input (e.g., voice control, virtual I/O input) from a user of client device 120. In another embodiment, AR device state program 300 determines that an element of interest, within a FOV, is excluded based on input from a user of client device 120. In some embodiments, AR device state program 300 interfaces with another networked computing system (e.g., server 102, computing system 150) to identify another element of interest within a received image.

In step 310, AR device state program 300 determines a change for element of interest. In an embodiment, AR device state program 300 utilizes various trigonometric, geometric, algebraic, arithmetic, and optical equations to determine (i.e., calculate) a change to an element of interest. In various embodiments, AR device state program 300 may include additional information based on tracking and/or motion analysis for determining (e.g., calculating, estimating) a change to an element of interest. In various embodiments, AR device state program 300 identifies a change to an element of interest by interfacing with another networked computing system (e.g., server 102, computing system 150) to utilize additional programs, such a modeling program, an image enhancement program, a facial recognition program, etc.

In one embodiment, AR device state program 300 utilizes one or more determined changes of state data for an AR input (as discussed with respect to step 308) to determine a change for an element of interest. In one scenario, AR device state program 300 utilizes state data corresponding to a magnification for AR input device 124 to determine changes to one or more elements of interest. In one example, AR device state program 300 determines that the magnification of AR input device 124 changes by a factor of two. AR device state program 300 may also determine that AR input device 124 and/or client device 120 did not change position and/or orientation (e.g., lack of translation and/or rotation).

In another example (described in further detail with respect to FIGS. 4a, 4b, and 4c), AR device state program 300 calculates that based on a change a 2× change of magnification that at least a portion of each previously identified element of interest in a FOV of a user occurs in the FOV of AR input device 124. In this example, AR device state program 300 calculates that tangential distances (e.g., pixel count) between elements of interest within the FOV of a user are twice the tangential distances between elements of interest within the FOV of AR input device 124. Therefore, AR device state program 300 determines that a partial element within the FOV of AR input device 124 corresponds to an element of interest within the FOV of a user. In another scenario, AR device state program 300 utilizes state data corresponding to positional changes to determine a change for an element of interest. In an example, AR device state program 300 utilizes state data from flexures of an AR input device 124 to determine a compensated position for an element of interest and a corresponding content overlay.

Referring to step 310 in a further embodiment, AR device state program 300 determines a change for an element of interest based on including tracking information for an element of interest and/or one or more changes of state data for an AR device. In one example, AR device state program 300 includes state data from sensors 123 (e.g., a proximity detector) to determine that an element of interest that changes size between images is the same element of interest. In another example, AR device state program 300 includes state data from sensors 123 (e.g., an altimeter) to derive a change in size and/or position of one or more elements of interest based on change of elevation.

Still referring to step 310, in an alternative embodiment, AR device state program 300 determines a change for an element of interest in response to an input. In one scenario, AR device state program 300 determines that an element of interest is deselected by a user. In another scenario, based on a change of magnification and/or orientation, AR device state program 300 may receive another selection of an element of interest from AR overlay program 200 that was not visible at a previous magnification and/or orientation. In another scenario, AR device state program 300 may further analyze an element of interest utilizing one or more recognition programs (e.g., speech, image, etc.) to identify additional information for an element of interest that was not identified at a previous magnification and/or orientation. Subsequently, AR device state program 300 may modify and/or update a content overlay to include additional information corresponding to the further analyzed element of interest.

In step 312, AR device state program 300 modifies an AR output. In one embodiment, AR device state program 300 utilizes one or more determined changes associated with an element of interest and a corresponding content overlay to modify an AR output. In one embodiment, AR device state program 300 modifies an AR output displayed by client device 120 to a user via AR output device 125. In another embodiment, AR device state program 300 modifies an AR output displayed by computing system 150 via UI 152. In one scenario, AR device state program 300 communicates a magnified FOV that is input to AR input device 124, and one or more associated content overlays to an instance of UI 152 of computing system 150. In another scenario, AR device state program 300 communicates a FOV and associated content overlays as seen (e.g., AR output device 125) by a user of client device 120 to another instance of UI 152 of computing system 150. In some scenarios, AR device state program 300 communicates both aforementioned fields of view to different instances of UI 152 of computing system 150.

In some embodiments (described in further detail with respect to FIGS. 4b, and 4c), AR device state program 300 modifies an output displayed by AR output device 125, based on visual conflict avoidance. In an example, AR device state program 300 identifies a visual conflict among one or more elements of interest of an FOV, one or more content overlays corresponding to the elements of interest, one or more AR overlays of client device 120, and various user and/or system preferences. In other embodiments, AR device state program 300 modifies an output of AR input device 124 displayed by an instance of AR output device 125. In an example, AR device state program 300 determines that the FOV of AR input device is constrained. AR device state program 300 determines that one or more content overlays are modified to display within an emulated FOV of AR input device 124. In various scenarios, AR device state program 300 modifies an AR output based on inputs from an AR program executing on client device 120 and/or various user preferences. In an example (referring to FIGS. 4d, 4e, and 4f), AR device state program 300 determines that multiple visual conflicts occur among AR elements and elements of interest when a user of client device 120 responds to text message 403. Based on AR device state program 300 modifying the positions of one or more AR elements, such as OV21 and OV32 to OV28C and OV38C; an AR program executing on client device 120 identifies a visual conflict associated with text message 403 and communicates the conflict to AR device state program 300. AR device state program 300 utilize the communicated visual conflict information and determines another position for the text message, as depicted by text message 472.

In an alternative embodiment, AR device state program 300 modifies an AR output based on additional information and/or state data provided by sensors 123, a different instance of AR input device 124 (e.g., a UV camera), and/or I/O devices 126 (e.g., a directional microphone). In one example, AR device state program 300 may modify an AR output based on a different instance of AR input device 124, such as a UV camera that identifies another image under a layer of paint, and AR device state program 300 includes a content overlay identifying a location for the other image. In another example, AR device state program 300 may modify an AR output based on input from I/O device 126 and a voice recognition program. In this example, AR device state program 300 may include a content overlay identifying a language spoken by an individual that is identified as an element of interest.

Figure 4A:
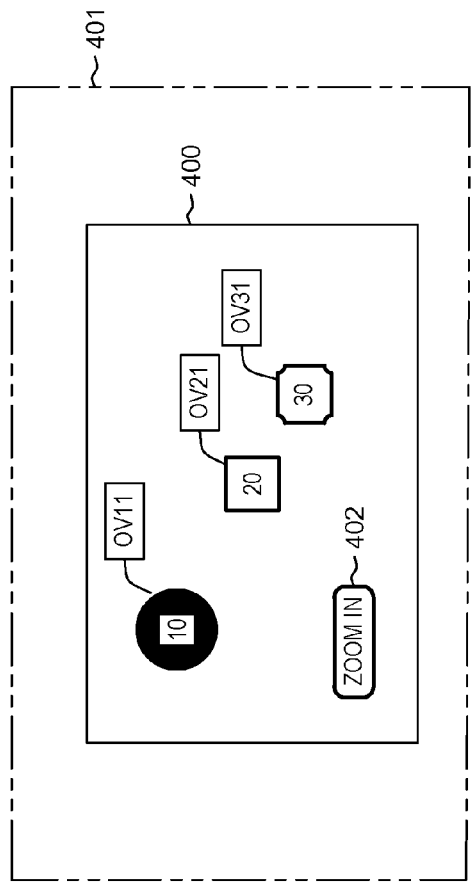
FIG. 4a depicts an illustrative example of an AR device responding to an observation of a user, in accordance with an embodiment of the present invention.

FIG. 4a depicts an illustrative example of an AR device responding to a physical observation of a user, in accordance with an embodiment of the present invention. In an example, a user of client device 120 positions one or more instances of AR input device 124 such that a subset of elements of area of observation 401 are included in FOV 400 of AR input device 124. In this example, FOV 400 includes visual elements (VE) 10, 20, and 30. In some embodiments, FOV 400 corresponds to a viewing area that a user observes (e.g., perceives) while utilizing client device 120, and FOV 400 may include AR content superimposed by an instance of AR output device 125.

In one embodiment, FOV 400 is substantially similar between AR input device 124 (e.g., a camera associated with client device 120) and an instance of AR output device 125 associated with client device 120. In another embodiment, VE 10 (solid shading), VE 20, and VE 30 are identified by a user as elements of interest. In some embodiments, AR overlay program 200 utilizes client device 120 to analyze elements of interest of FOV 400 and determines information included in OV11, OV21, OV31 for the corresponding elements of interest, VE 10, VE 20, and VE 30 of FOV 400. In other embodiments, AR overlay program 200 utilizes a networked resource (e.g., server 102, computing system 150) to analyze elements of interest of FOV 400 and to determine information included in OV11, OV21, OV31. In various embodiments, an AR program executing on client device 120 determines the presentation (e.g., size, position, style, etc.) of content overlays received from server 102. In FIGS. 4a, 4b, 4c, 4d, 4e, and 4f, content overlays (OVs) are depicted as callout boxes with a connector that indicates a VE that corresponds to an OV. In addition, in the depicted examples a suffix "C" indicates element associated with a camera and a suffix "U" indicates elements associated with a FOV of a user.

In another embodiment, FOV 400 is associated with a FOV of a user of client device 120 and an instance of AR output device 125. AR output device 125 superimposes (e.g., projects) OV11, OV21, and OV31 corresponding to VE 10, VE 20, and VE 30 within the field of view of a user. In one scenario, FOV 400 includes VE 10, VE 20, and VE 30, but does not include text message 402 "Zoom in." In this scenario, FOV 400 depicts an input (e.g., video image) of AR input device 124 without including OVs, and AR device state program 300 and/or client device 120 transmits FOV 400 to computing system 150 for display by UI 152. In some scenarios, a version of FOV 400 that is transmitted to computing system 150 includes VE 10, VE 20, and VE 30; and corresponding content overlays OV11, OV21, and OV31. In another scenario, client device 120 receives a text message from a user of computing system 150. Client device 120 includes the received text message as text message 402. In an embodiment, AR device state program 300 utilizes AR output device 125 to superimpose OV11, OV21, and OV31 corresponding to VE 10, VE 20, and VE 30; and text message 402 within the field of view of a user of client device 120.

Figure 4C:
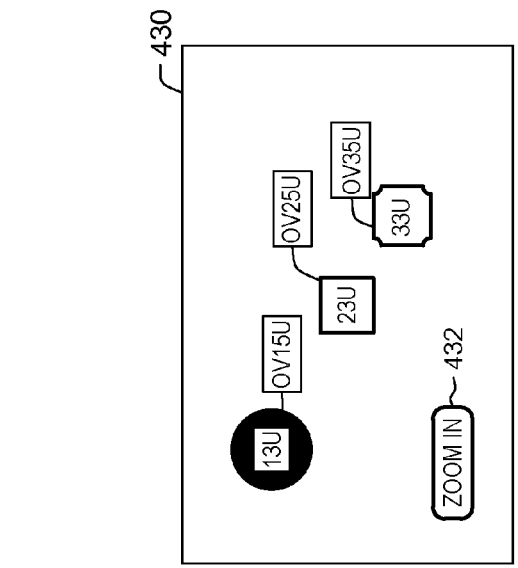
FIG. 4c depicts an illustrative example of changes to content overlays within a field of view of a user based on an AR device responding to an optically zoomed camera image, in accordance with an embodiment of the present invention.
Figure 4B:
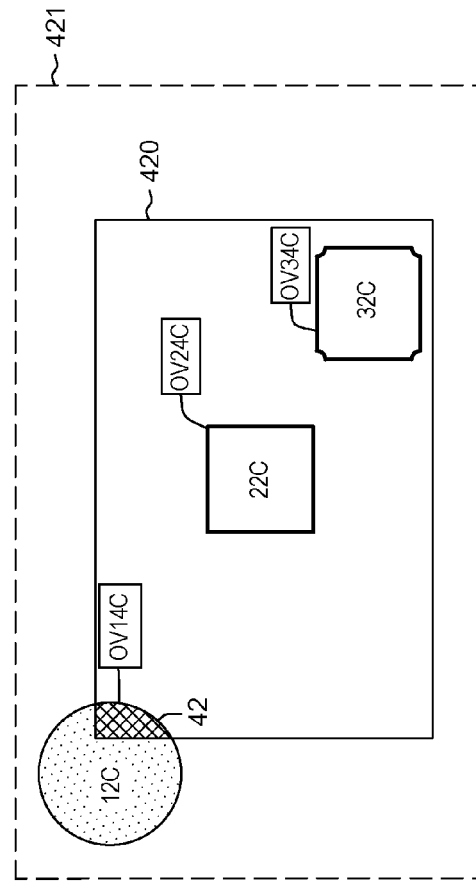
FIG. 4b depicts an illustrative example of a response of an AR device to an optically zoomed camera image of an area of observation of a user, in accordance with an embodiment of the present invention.

FIG. 4b depicts an illustrative example of a response of an AR device to an optically zoomed camera image of an area of observation of a user, in accordance with an embodiment of the present invention. In an embodiment, in response to text message 402, a user of client device 120 increases the optical magnification of AR input device 124 (e.g., a camera) without changing the position and/or orientation of client device 120. FOV 420 results from the optical magnification (e.g., a 2× zoom) of FOV 400. In an example, FOV 420 does not include OV14C, OV24C, and OV34C. In this example, FOV 420 corresponds to a magnified view of area of observation 401 as input to AR input device 124. In one scenario, AR overlay program 200 analyzes this instance of FOV 420, identifies VE 22C and VE 32C, and determines information that is included in corresponding content overlays OV24C and OV34C. In some scenarios, OV24C, and OV34C correspond to OV21, and OV31.

In various embodiments, virtual FOV 421 corresponds to the area of FOV 400. In an embodiment, AR device state program 300 utilizes state data associated with AR input device 124 to calculate (as discussed with reference to FIG. 3, step 310) that a portion of VE 10 occurs within FOV 420 (e.g., element 42 (diagonal hash shading area)). In this illustrative example, VE 12C (stippled shaded circled) corresponds to a magnified version of VE 10, and VE 12C occurs within virtual FOV 421(dashed box). Therefore, AR device state program 300 assigns OV14C, which corresponds to OV11, to element 42.

Still referring to FIG. 4b, in a further embodiment, an AR program executing on client device 120 determines that FOV 420 constrains the positions of OV14C and OV34C relative to the positions of OV11 and OV31 within FOV 400, and determines alternative positions (as depicted within FOV 420) for OV14C and OV34C. In various embodiments, an instance of FOV 420 includes: VE 22C, OV24C, VE 32C, OV34C, element 42, and OV14C. AR device state program 300 and/or client device 120 may communicate this instance of FOV 420 to computing system 150 and displayed via UI 152 as an emulated instance of an AR output device.

FIG. 4c depicts an illustrative example of changes to content overlays within a field of view of a user based on an AR device responding to an optically zoomed camera image, in accordance with an embodiment of the present invention. In an embodiment, FOV 430 includes: VE 13U (solid shading), VE 23U, and VE 33U; and corresponding OV15U, OV25U, and OV35U. In some embodiments, AR device state program 300 and/or an AR program executing on client device 120 reproduces (e.g., mimics) the position of each OV of (referring to FIG. 4b) magnified FOV 420 within AR output device 125 (i.e., FOV 430). In an example, OV15U, OV25U, and OV35U correspond to OV14C, OV24C, and OV34C of FIG. 4b.

In an embodiment, FOV 430 is the output of AR output device 125 as viewed by a user of client device 120. In this illustrative example, in response to a lack of visual conflict between text message 432 and one or more visual elements and/or content overlays, AR device state program 300 maintains text message 432 at a position similar to (referring to FIG. 4a) text message 402 of FOV 400. However, AR device state program 300 identifies a visual conflict based between the position of OV15U and the position OV25U based on the corresponding position of (referring to FIG. 4a) OV21 relative to VE 20. In one instance, AR device state program 300 modifies an AR output to position OV25U (e.g., OV21) below VE 23U within FOV 430. In addition, AR device state program 300 may modify the position of (referring to FIG. 4b) OV24C within FOV 420 to reproduce the position of OV25U within FOV 430. In an embodiment, AR device state program 300 utilizes AR output device 125 to superimpose OV15U, OV25U, and OV35U corresponding to VE 13U, VE 23U, and VE 33U; and text message 432 within the field of view of a user of client device 120.

FIG. 4d depicts an illustrative example of an AR device responding to a physical observation of a user, in accordance with an embodiment of the present invention. In the example, FIG. 4d includes visual elements and content overlays that are depicted in FIG. 4a with the exception of a change to the text message 402 within FOV 400. FIG. 4d, for example, a user of computing system 150 communicates text message 403 "Zoom and focus on VE 30" to a user of client device 120. In an embodiment, AR device state program 300 utilizes AR output device 125 to superimpose OV11, OV21, and OV31 corresponding to VE 10, VE 20, and VE 30; and text message 403 within the field of view of a user of client device 120.

FIG. 4e depicts an illustrative example of a response of an AR device to a change of orientation and an optically zoomed camera image of an area of observation of a user, in accordance with an embodiment of the present invention. In this example, user of client device 120 modifies (e.g., pans) an orientation of client device 120 to position (referring to FIG. 4d) VE 30 closer to the center of FOV 400, resulting in a position for VE 36C (i.e., VE 30) that approximately corresponds to the center of FOV 460.

In this example, FIG. 4e includes FOV 460, which includes VE 26C and 36C; and virtual FOV 461 (dashed box), which includes VE 16C (stippled shading). In one embodiment, AR device state program 300 utilizes state data of client device 120 and determines that VE 26C and VE 36C correspond to VE 20 and VE 30 of FOV 400. In another embodiment, AR overlay program 200 assigns OV28C and OV38C respectively to VE 26C and VE 36C. In some embodiments, an AR program executing on client device 120 determines that FOV 460 constrains the position OV28C relative to VE 26C (referring to FIG. 4d) with respect to the position of OV21 relative to VE 20. AR device state program 300 interfaces with the AR program executing on client device 120 and maintains OV38C at a position similar to (referring to FIG. 4d) OV31 within FOV 400; however, AR device state program 300 locates OV28C at a different position.

In various embodiments (as discussed with reference to FIG. 3, step 310), AR device state program 300 utilizes AR device state data and tracking information, obtained from AR overlay program 200, to calculate that VE 16C (stippled shading) of virtual FOV 461 corresponds to (referring to FIG. 4d) VE 10. In some embodiments, AR device state program 300 and/or client device 120 communicates FOV 460 to a user of computing system 150 and includes VE 26C, OV28C, VE 36C, and OV38C.

FIG. 4f depicts an illustrative example of changes to content overlays and visual elements within a field of view of a user, based on a change of orientation of an AR device and an optically zoomed camera image of an area of observation of a user, in accordance with an embodiment of the present invention. In an embodiment, FOV 470 includes: VE 17U (solid shading), VE 27U, and VE 37U; corresponding content overlays OV19U, OV29U, and OV39U; and text message 472. In some embodiments, AR device state program 300 reproduces the position of each OV (referring to FIG. 4e) that corresponds to an OV of FOV 400. In an example, content overlays OV29U, and OV39U correspond to OV28C, and OV38C. In another embodiment, an AR program executing on client device 120 determines (referring to FIG. 4d) that text message 403 visually conflicts with content overlay OV29C. AR device state program 300 interfaces with the AR program executing on client device 120 and repositions text message 403 as depicted by text message 472 of FOV 470.

In various embodiments (referring to FIG. 4f), AR device state program 300 may determine that FOV 470 is equivalent to virtual FOV 461 of FIG. 4e. Although VE 16C is not visible to AR input device 124, AR device state program 300 determines (referring to FIG. 3, step 310), based changes to state data of AR input device 124 and client device 120, that VE 17U corresponds to (referring to FIG. 4d) VE 10 of FOV 400. In an embodiment, AR device state program 300 assigns OV19U to VE 17U. In another embodiment, OV19U, OV29U, and OV39U include the information depicted in corresponding OVs OV11, OV21, and OV 31 of FIG. 4d. In an embodiment, AR device state program 300 utilizes AR output device 125 to superimpose OV19U, OV29U, and OV39U corresponding to VE 17U, VE 27U, and VE 37U; and text message 472 within the field of view of a user of client device 120.

Figure 5:
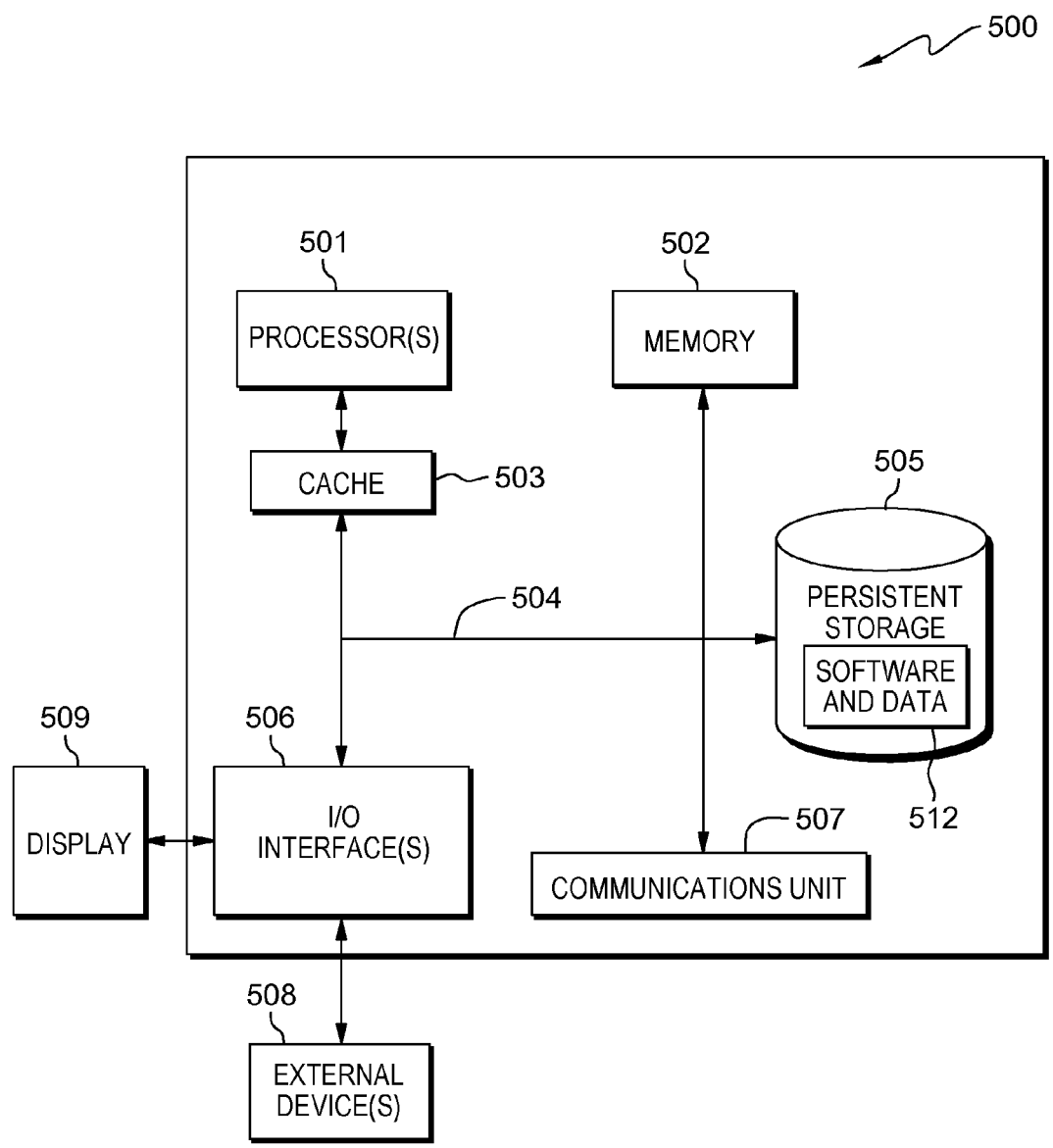
FIG. 5 is a block diagram of components of a computer, in accordance with an embodiment of the present invention.

FIG. 5 depicts computer system 500, which is representative of server 102, client device 120, and computing system 150. Computer system 500 is an example of a system that includes software and data 512. Computer system 500 includes processor(s) 501, memory 502, cache 503, persistent storage 505, communications unit 507, I/O interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to client device 120, software and data 512 includes UI 122, AR overlay program 200, and AR device state program 300, and various programs (not shown). With respect to computing system 150, software and data 512 includes UI 152 and various programs (not shown).

Communications unit 507, in these examples, provides for communications with other data processing systems or devices, including resources of server 102, client device 120, and computing system 150. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. In an embodiment with respect to client device 120, external device(s) 508 include: sensors 123, AR input device 124, and I/O devices 126. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone. In an embodiment with respect to client device 120, display 509 includes AR output device 125.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing a content overlay, the computer program product comprising:
   one or more computer readable storage media and program instructions stored on the one or more computer readable storage media, the program instructions comprising:
   program instructions to identify a first image viewed by an augmented reality (AR) system, wherein the AR system includes: two AR input devices, wherein a first AR input device includes a camera with an optical zoom mechanism; and a first AR output device and second AR output device;
      wherein the first AR output device depicts a first field of view (FOV) as viewed by the camera of the first AR input device; and
      wherein the second AR output device is associated with an unmagnified second FOV of a user as viewed by a corresponding second AR input device; and
      wherein each AR output device displays one or more AR content overlays, the AR content overlay corresponding to an element of interest within a corresponding FOV of the user of the AR system;
   program instructions to identify a first element of interest and a second element of interest within the first image of the unmagnified second FOV;
   program instructions to associate a corresponding first AR content overlay for the first element of interest and a corresponding second AR content overlay for the second element of interest within the first FOV and the unmagnified second FOV;
   program instructions to identify information corresponding to the first element of interest and the second element of interest, wherein the information corresponding to an element of interest is included within the corresponding AR content overlay of the element of interest;
   program instructions to identify a second image viewed by the AR system;
   program instructions to determine one or more differences between the first image and the second image, wherein the second image includes at least the first element of interest, and wherein one or more differences between the first image and the second image are selected from the group consisting of:
      a change in magnification of the first AR input device, as initiated by the user, thereby creating a magnified first FOV;
      a change in position of the AR system, as initiated by the user,
      a change in position of one or more elements of interest within a corresponding FOV;
   program instructions to modify a position of at least the first AR content overlay based, at least in part, on the one or more differences between the first image and the second image, wherein determining one or more differences further comprises:
      program instructions to determine a first set of positions corresponding to the first element of interest and the second element of interest within the first FOV associated with the first image, and a position corresponding to the first element of interest within the magnified first FOV associated with the second image; and
      program instructions to calculate a second set of positions corresponding to the first element of interest and the second element of interest within the magnified first FOV based, at least in part, on the first set of positions, the position corresponding to the first element of interest within the second image, and one or more differences between corresponding state data values of the AR system of the first image and the state data values of the AR system of the second image;
         wherein the corresponding state values of the AR system are comprised of: a magnification value of the first AR input device and an orientation of the AR system;
   program instructions to determine whether the magnified first FOV associated with the second image includes at least a portion of the second element of interest based, at least in part, on the calculated second set of positions; and
   responsive to determining that the magnified first FOV associated with the second image includes at least a portion of the second element of interest, program instructions to modify the position of the second AR content overlay, within the magnified first FOV such that the second AR content overlay is associated with the at least portion of the second element of interest included within magnified first FOV associated with the second image, wherein modifying the position of the second AR content overlay further comprises:
      program instructions to determine whether the positions corresponding to the first AR content overlay and the second AR content overlay within the magnified first FOV and unmagnified second FOV of the second image create one or more visual conflicts, and in response, modifying the positions of first AR content overlay and the second AR content overlay within the magnified first FOV and unmagnified second FOV associated with the second image such that the positions of the first AR content overlay and the second AR content overlay are reproduced between the magnified first FOV and unmagnified second FOV, and avoiding visual conflicts; and
   program instructions to display respective instances of the first AR content overlay and respective instances of the second AR content overlay respectively positioned and associated with the first element of interest and the at least portion of the second element of interest included within the second image corresponding to the magnified first FOV utilizing the first AR output device, and the unmagnified second FOV utilizing the second AR output, to the user.

* * * * *